United States Patent [19]

Tomida

[11] Patent Number: 5,896,207
[45] Date of Patent: Apr. 20, 1999

[54] COLOR PRINTER AND FACSIMILE APPARATUS WHICH OUTPUTS IN COLOR OR MONOCHROME BASED ON PREDETERMINED CONDITIONS

[75] Inventor: Wataru Tomida, Owariasahi, Japan

[73] Assignee: Brother Kogyo Kabushiki Kaisha, Nagoya, Japan

[21] Appl. No.: 08/723,921

[22] Filed: Oct. 1, 1996

[30] Foreign Application Priority Data

Nov. 13, 1995 [JP] Japan ................... 7-294362
Nov. 20, 1995 [JP] Japan ................... 7-301481

[51] Int. Cl.$^6$ ............... H04N 1/21; H04N 1/00; H04N 1/46
[52] U.S. Cl. ............ 358/537; 358/439; 358/529; 358/500; 399/27; 399/54; 395/113
[58] Field of Search ............... 358/400, 401, 358/404, 434, 439, 448, 452, 468, 296, 500, 501, 502, 503, 518, 537, 529; 395/101, 107, 108, 109, 114, 117, 113; 399/27, 28, 54

[56] References Cited

U.S. PATENT DOCUMENTS 5,357,347 10/1994 Hirose et al. ................... 358/296
5,696,598 12/1997 Yoshida et al. ................... 358/500
5,719,686 2/1998 Sakamoto et al. ................ 358/530
5,721,620 2/1998 Arai et al. ................... 358/296

FOREIGN PATENT DOCUMENTS

8-079543 3/1996 Japan ................... H04N 1/46

*Primary Examiner*—Kim Yen Vu
*Assistant Examiner*—Kimberly A. Williams
*Attorney, Agent, or Firm*—Oliff & Berridge, PLC

[57] ABSTRACT

A color facsimile apparatus for color-recording color image data received by facsimile communication onto a predetermined recording sheet. When a facsimile receiving operation is performed under a predetermined condition, the color facsimile apparatus sends a protocol signal to the sending facsimile apparatus, the protocol indicating that the receiving capability of the color facsimile apparatus is for receiving monochrome image data. Also disclosed is an image communication apparatus for color-printing color image data received by image data communication onto a predetermined recording sheet. When reception of image data is performed under a predetermined condition, the received color image data are converted to monochrome image data on which predetermined processing is performed.

22 Claims, 7 Drawing Sheets

| COMMUNICATION REPORT [RECEPTION] ||||  K
|---|---|---|---|
| DATE | TIME | TRANSMITTER | REMARKS |
| 11/6 | 12:05 | 0528537777 | COLOR |
| 11/8 | 18:32 | 0528537890 | MONOCHROME |
| 11/10 | 10:05 | 0396418219 | COLOR→MONOCHROME ← Na |
| ⋮ | ⋮ | ⋮ | ⋮ |

Fig. 6B

COLOR PRINTER AND FACSIMILE APPARATUS WHICH OUTPUTS IN COLOR OR MONOCHROME BASED ON PREDETERMINED CONDITIONS

BACKGROUND OF THE INVENTION

1. Field of the Invention

The present invention relates to a color facsimile apparatus for color-printing color image data received through facsimile communication onto a predetermined recording sheet.

2. Description of Related Art

It is known that, in transmission of image data via facsimile communication, the data of the sending capability of a sending facsimile apparatus and of the receiving capability of a receiving facsimile apparatus are exchanged in the mutual transmission of protocol signals to be performed before transmission of the image data. The transmission of the image data is then performed according to the contents of the communication capability matched between both the sending and receiving apparatuses.

For this reason, a conventional color facsimile apparatus is constituted such that, when that color facsimile apparatus is on the receiving side, the receiving facsimile apparatus always sends a protocol signal to notify the sending facsimile apparatus that the receiving facsimile apparatus provides the color receiving capability.

Further, when color image data are received via facsimile communication, the conventional facsimile apparatus is constituted to handle the received image data always as the color image data. Namely, in the conventional color facsimile apparatus, the received color image data are stored in a memory as they are. And, when transferring the color image data to the printing section for printing on a recording sheet, the color image data are transferred to the printing section as they are.

However, the conventional color facsimile apparatus is constituted such that the receiving apparatus sends data to the sending apparatus notifying that the receiving apparatus has the color receiving capability, so that, if the sending apparatus is a color facsimile apparatus and the image data to be sent by the same are color image data, the receiving apparatus always receives the color image data. Hence, conventionally, the following problems are sometimes encountered.

Usually, color image data are constituted of at least three kinds of data representing tones of red, green, and blue (R, G, B). Compared with monochrome image data represented by digital signals of "0" and "1," the volume of the color image data is far greater than that of the monochrome image data per document for example. Consequently, in a so-called intercepting reception held for printing (reception by a memory) in which image data received by facsimile communication are sequentially stored in a memory before being printed, color image data being received often overflows the memory to cause a communication error, which seldom happens in the case of monochrome image data.

In addition, some color facsimile apparatuses incorporate a color printer that prints received color image data on a recording sheet in color ink. Such color facsimile apparatuses cannot print in color if the color ink is exhausted. In the conventional color facsimile apparatus, however, color image data are received and processed as color image data regardless of the situation in which color printing is difficult as described above. Consequently, conventionally, the received color image data cannot be outputted on a recording sheet properly, thereby making it impossible to confirm the contents of the received image data.

Further, in the facsimile apparatus of the above-mentioned type, even if color printing can be performed properly or there is a memory space enough for storing image data, users sometimes desire to process color image data as monochrome image data in order to save color ink, allocate a memory space, or shorten communication time. Conventionally, however, as described above, if the sending facsimile apparatus is a color facsimile apparatus that sends color image data, the receiving facsimile apparatus always receives the color image data and processes the received image data always as color image data, failing to meet the above-mentioned user requirements.

SUMMARY OF THE INVENTION

In view of the above-mentioned drawbacks, it is therefore an object of the present invention to provide a color facsimile apparatus that is free from a communication error or difficulty in printing received image data due to an insufficient memory space caused by reception of color image data and is available as desired by users.

In carrying out the invention and according to one aspect thereof, there is provided a color printing apparatus for printing color image data composed of multicolor image information, comprising converting means for converting color image data to monochrome image data composed of monochrome image information when a predetermined condition is satisfied.

In carrying out the invention and according to another aspect thereof, there is provided a color facsimile apparatus for receiving color image data composed of multicolor image information to output the same. The color facsimile apparatus includes communication means for receiving image data from a facsimile apparatus of the other side, and response means for answering a protocol for requesting the facsimile apparatus of the other side to transmit monochrome image data if a predetermined condition is found satisfied at termination of a call from the facsimile apparatus of the other side.

In carrying out the invention and according to still another aspect thereof, there is provided a color facsimile apparatus that includes communication means for receiving color image data composed of multicolor image information; printing means for printing a color image by use of a plurality of colors of color materials; and control means for converting the color image data to monochrome image data composed of monochrome image information to output the resultant monochrome image data to the printing means if a predetermined condition is satisfied.

As described and according to the color printing apparatus associated with the present invention, color image data are converted to monochrome image data composed of monochrome image information when a predetermined condition is satisfied, so that a monochrome output is enabled when there is only a small amount of free memory space or the user desires a monochrome output. This setup prevents interruption of printing due to memory shortage and shortens printing time.

According to the color facsimile apparatus associated with the present invention, when facsimile reception is performed under a predetermined condition, control is made such that a protocol signal indicating that the receiving capability of this color facsimile apparatus is for receiving monochrome image data is transmitted to a facsimile apparatus of the other side, thereby preventing color image data from being always received and enabling the reception of monochrome image data. Consequently, if there is a possibility that the reception of color image data causes a processing trouble on the same, monochrome image data are received instead of the color image data to prevent a trouble from occurring on the receiving facsimile apparatus, thereby ensuring proper facsimile reception.

Further, according to the other color facsimile apparatus associated with the present invention, when reception of image data is performed under a predetermined condition, control is made such that received color image data are converted to monochrome image data and thereafter a predetermined processing is performed on the resultant monochrome image data, so that, even if color image data are received in a situation in which a proper processing of the same is difficult, the color image data can be converted to monochrome image data for a proper processing. Consequently, unlike the conventional color facsimile apparatuses, the color facsimile apparatus associated with the present invention solves the problem of being unable to perform a proper or smooth processing on the received image data if the same are color image data and executes proper reception of image data.

BRIEF DESCRIPTION OF THE DRAWINGS

Preferred embodiments of the present invention will be described in detail with reference to the following figures wherein.

DETAILED DESCRIPTION OF THE PREFERRED EMBODIMENTS

In what follows, a first preferred embodiment of the invention will be described with reference to FIGS. 1 and 2.

Figure 1:
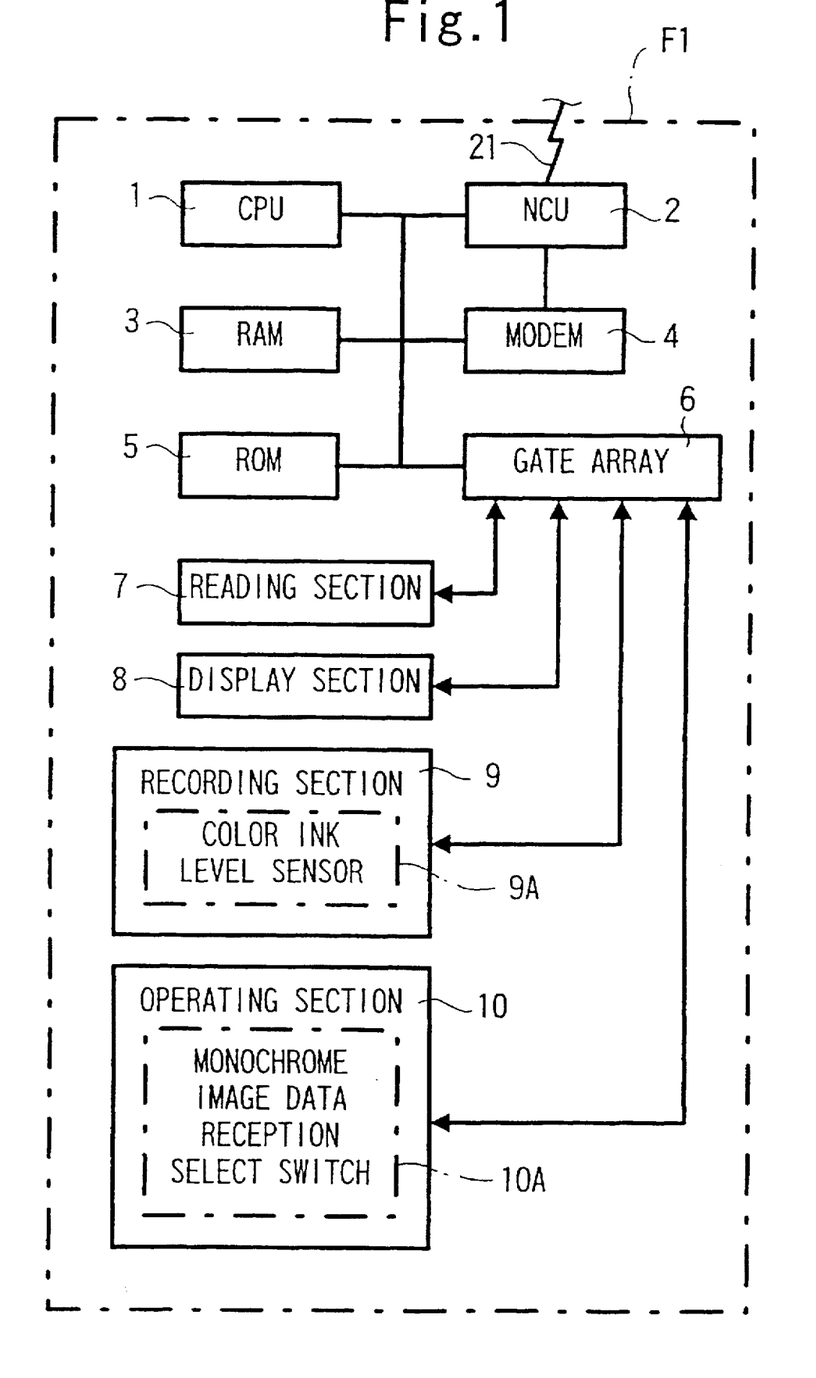
FIG. 1 is a block diagram illustrating a first preferred embodiment of a color facsimile apparatus.
Figure 2:
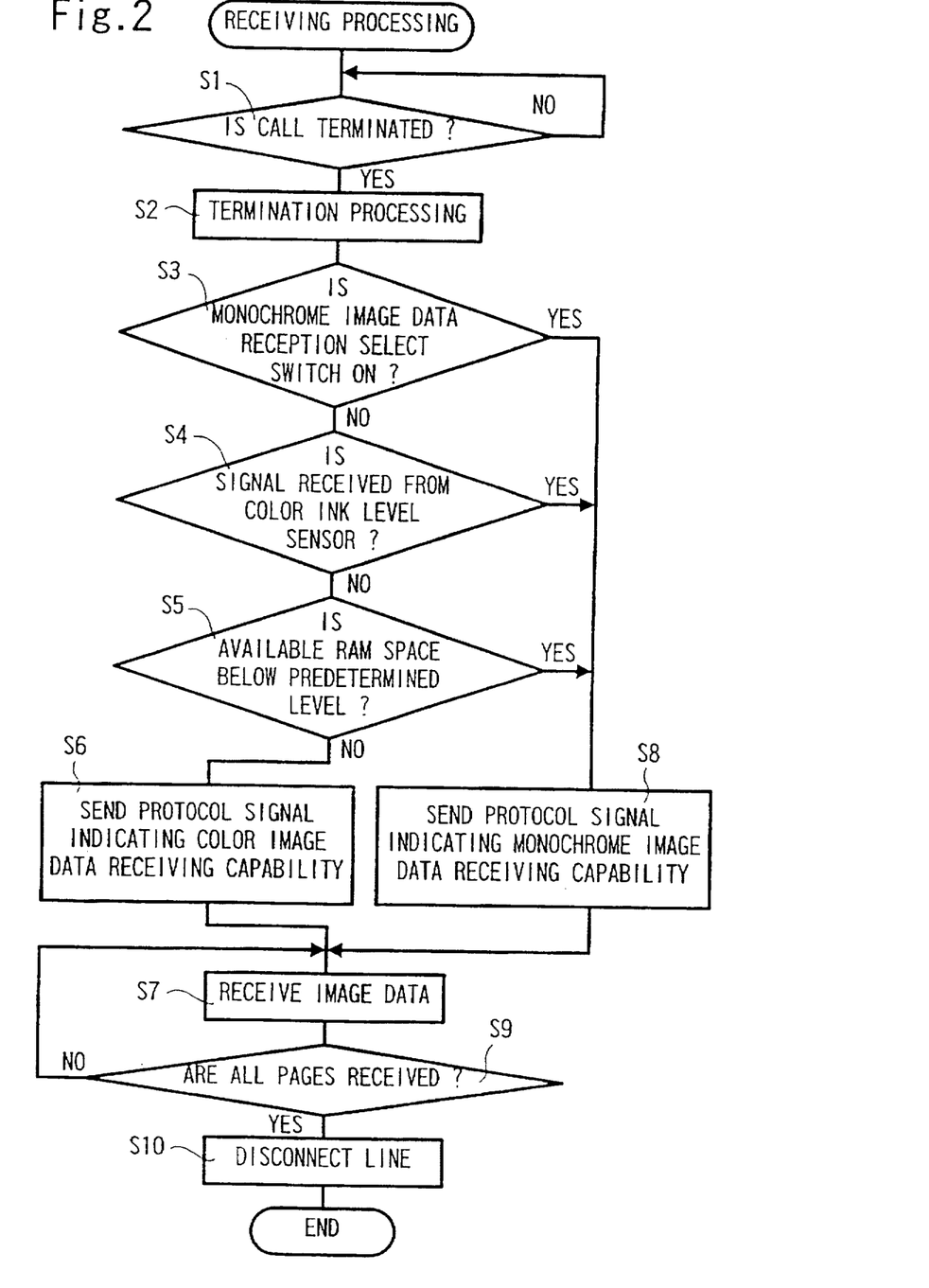
FIG. 2 is a flowchart describing an example of a receiving procedure of the color facsimile apparatus of FIG. 1.

FIG. 1 shows a circuit block diagram illustrating a first preferred embodiment of a color facsimile apparatus F1. The color facsimile apparatus F1 has a CPU 1, an NCU (Network Control Unit) 2, a RAM 3, a modem 4, a ROM 5, a gate array 6, a reading section 7, a display section 8, a recording section 9, and an operator section 10. The CPU 1, the NCU 2, the RAM 3, the modem 4, the ROM 5, and the gate array 6 are interconnected with a bus line. The gate array 6 is connected with the reading section 7, the display section 8, the recording section 9, and the operator section 10.

The CPU 1 controls the color facsimile apparatus F1 in its entirety, performing transmission control of a protocol signal to be described later. The NCU 2 is connected to a telephone line 21 to perform network control. The RAM 3 stores data of a variety of types and also serves as an image memory for storing image data received by facsimile communication and image data obtained by scanning a document by the reading section 7. The modem 4 modulates data to be sent and demodulates received data. The ROM 5 stores a variety of programs.

The gate array 6 functions as an input/output interface of the CPU 1 and, at the same time, converts RGB data coming from the reading section 7 to CMY (Cyan-Magenta-Yellow) data. The reading section 7 has a CCD (Charge Coupled Device), a three-color separation filter, and a document feed motor to read a multicolor document to output R, G, and B color signals. The display section 8 is composed of an LCD (Liquid Crystal Display) to make a variety of displays under control of the CPU 1.

The recording section 9 is composed of an ink jet color printer that enables color printing on a recording sheet based on the above-mentioned CMY data with a total of three color inks of cyan, magenta, and yellow or a total of four color inks of cyan, magenta, yellow, and black. The recording section 9 is provided with a color ink level sensor 9a for detecting the remaining amount of the color inks. The color ink level sensor is constituted such that, if the level of any one of the color inks drops below a predetermined level, a signal indicating thereof is outputted to the CPU 1.

One example of the color ink level sensor 9a is a sensor of a type in which a pair of electrodes is arranged at a predetermined height in an ink tank or ink cartridge containing a color ink to detect the remaining ink level based on a change in the electric resistance between the electrodes when the ink level drops below the pair of electrodes. It will be apparent to those skilled in the art that a sensor of another type may be used in which the remaining color ink level is detected optically. It will be also apparent to those skilled in the art that a sensor of still another type may be used in which only whether the ink remains or not is detected.

The operator section 10 is composed of a key switch group, from which signals indicating a destination facsimile number and an operation made by the user for example are transmitted to the CPU 1. The operator section 10 is provided with a monochrome image data reception select switch 10a. When this switch 10a is turned ON, a signal indicating thereof is transmitted to the CPU 1. The CPU 1 then puts the color facsimile apparatus F1 in the monochrome image data receive mode.

To be more specific, in the normal mode, in which the monochrome image data reception select switch 10a is not set to ON, the CPU 1 controls, basically at protocol signal exchange at the start of facsimile reception, the color facsimile apparatus F1 to transmit a protocol signal to a facsimile apparatus of the other side, the protocol signal indicating that the color facsimile apparatus F1 provides a color image data receiving capability. On the other hand, when the monochrome image data reception select signal 10a is set to ON and therefore the monochrome image data receive mode is set, the CPU 1 controls the color facsimile apparatus F1 to transmit a protocol signal to the facsimile apparatus of the other side, the protocol signal indicating that the color facsimile apparatus F1 provides a monochrome image data receiving capability.

Further, even if the monochrome image data receive mode is not set by operating the monochrome image data reception select switch 10a, the CPU 1 also transmits the above-mentioned protocol signal to the facsimile apparatus of the other side at the protocol signal exchange for facsimile communication if a signal indicating that the level of remaining ink is below a predetermined level comes from the color ink level sensor 9a of the recording section 9.

Further still, the CPU 1 accesses the RAM 3 at starting a facsimile receiving operation in order to determine an available memory space (a free memory space) of the RAM 3 for storing image data. Then, if the CPU 1 determines that the available memory space is lower than the predetermined level, the CPU 1 makes control such that the protocol signal is transmitted to the facsimile apparatus of the other side at the protocol signal exchange in facsimile communication, the protocol signal indicating that the color facsimile apparatus F1 provides the monochrome image data receiving capability, in the same manner as mentioned above.

In what follows, a processing procedure for facsimile reception will be described with reference to the flowchart of FIG. 2.

First, a call terminates at this color facsimile apparatus F1 (step S1; YES). Having a termination processing (step S2), the CPU 1 starts protocol signal exchange with the facsimile apparatus of the sending side (call originating side). If, at the protocol signal exchange, the monochrome image data reception select signal 10a is not set to ON (step S3; NO) and the CPU 1 is not receiving a signal from the color ink level sensor 9a indicating that the ink is running short (step S4; NO), and if the available memory space of the RAM 3 is not less than a predetermined level (step S5; NO), the CPU 1 makes control such that the protocol signal indicating that this color facsimile F1 provides the color image data reception capability is sent to the facsimile apparatus of the other side (step S6).

Consequently, if the facsimile apparatus of the sending side is a color facsimile apparatus for sending color image data, the receiving color facsimile apparatus F1 properly receives color image data at the reception of image data in step S7. The color image data thus received are decoded by the CPU 1 to be stored in the RAM 3. Alternatively, the decoded data are transferred to the recording section 9 to be printed on a recording sheet in the known ink jet printing manner. When the image data have all been received (step S9; YES), the telephone line is disconnected (step S10), upon which the facsimile communication comes to an end.

The above-mentioned reception of color image data is performed presupposing that the available memory space of the RAM 3 be not less than a predetermined level. Therefore, if the above-mentioned color image data are received and held for printing (reception by a memory), the RAM 3 will not immediately run short of available memory space, thereby ensuring proper intercepting reception.

In addition, the above-mentioned reception of color image data is performed presupposing that there is a sufficient amount of color ink remaining in the ink jet color printer constituting the recording section 9. Therefore, color printing onto the recording sheet while receiving color image data can be performed properly, thereby preventing the ink from running short during facsimile reception.

On the other hand, unlike the above-mentioned case, if the monochrome image data reception select switch 10a is set to ON and therefore the monochrome image data receive mode is selected (step S3; YES) when a call terminates at the color facsimile apparatus F1, the CPU 1 transmits a protocol signal to the facsimile apparatus of the sending side, indicating that the color facsimile apparatus F1 provides the monochrome image data receiving capability (step S8).

Even if the monochrome image data reception select switch 10a is not set to ON (step S3; NO), if the CPU 1 has received from the color ink level sensor 9a a signal indicating that the remaining amount of color ink is below a predetermined level (step S4; YES), or if the available memory space of the RAM 3 is below a predetermined level (step S5; YES), the CPU 1 also transmits the protocol signal to the facsimile apparatus of the sending side, indicating that the color facsimile apparatus F1 provides the monochrome image data receiving capability (step S8).

Consequently, in the above-mentioned case, if the facsimile apparatus of the sending side is a color facsimile apparatus, the color facsimile apparatus F1 of the receiving side is recognized as a monochrome facsimile apparatus. As a result, the facsimile apparatus of the sending side converts color image data to monochrome image data and sends the resultant monochrome image data to the color facsimile apparatus F1. In step S7 in which reception of image data is performed, the color facsimile apparatus F1 receives these monochrome image data.

As compared with color image data, monochrome image data is far smaller in the amount of data, so that, for intercepting reception, the possibility of causing a communication error due to the memory space shortage in the RAM 3 may be decreased. Further, if the color ink has run short to interrupt the color printing on the recording section 9, making the color facsimile apparatus F1 perform the reception of the monochrome image data as mentioned above can continue the color facsimile reception as monochrome facsimile reception by using a remaining ink in the recording section 9.

Still further, if the monochrome image data reception select switch 10a is left set to ON, monochrome image data can always be received regardless of the remaining amount of color inks and the available free space of the RAM 3, providing the user with advantages that the consumption of color inks can be saved if desired and a certain amount of available space in the RAM 3 can be allocated if desired. In addition, a time for communication of monochrome image data is shorter than that of color image data per sheet of document for example, thereby enhancing the operational efficiency of the color facsimile apparatus or saving communication cost.

It is desired that, in the transmission of monochrome image data as mentioned above, the data be printed always in black ink in the recording section 9. This is because printing of monochrome image data in yellow for example reduces legibility of the resultant document.

In addition, in the above-mentioned embodiment, monochrome image data are received if the remaining color ink level in the recording section 9 is below a predetermined level; however, the present invention is not restricted thereto. For example, the color facsimile may also be constituted such that only whether a color ink remains or not is determined by the sensor and, if all color inks remain, a protocol signal indicating that the color facsimile apparatus provides the color image data receiving capability regardless of the remaining quantities is transmitted, while, if the remaining quantity of any one of the color inks is found zero, a protocol signal indicating that the color facsimile apparatus provides the monochrome image data receiving capability is transmitted.

It should be noted that an example in which the recording section for color printing on a recording sheet is in the color printing disabled state is not limited to the above-mentioned case in which the color ink runs short. If a printer of a type in which color-developing heat-sensitive recording sheet is used is provided and if this heat-sensitive recording sheet is not set in place in the recording section or has run short, color printing is disabled. In such a situation, the color facsimile apparatus associated with the present invention may also be constituted to transmit the protocol signal indicating that the color facsimile apparatus provides the monochrome image data receiving capability.

Further, if means for detecting color ink clogging in a predetermined number of ink nozzles is provided when the ink jet printer is used, the color facsimile apparatus associated with the present invention may be constituted such that the protocol signal indicating that the color facsimile apparatus provides the monochrome image data receiving capability if the clogging has been detected on a predetermined nozzle by that detecting means.

In addition, in the present invention, the monochrome image data reception select switch 10a need not be provided as a dedicated operator switch; rather, the monochrome image data receive mode may be selected by a combination of operations of a plurality of numeric keys for example.

In the above-mentioned first embodiment of the invention, the color ink jet printer is used for the recording section 9. It will be apparent to those skilled in the art that a color laser beam printer may be used instead of the color ink jet printer. If the color laser beam printer is used, means for detecting the remaining amount of toner is provided instead of the means for detecting the remaining amount of ink.

In what follows, a second preferred embodiment of the present invention will be described with reference to FIGS. 3 through 6.

Figure 3:
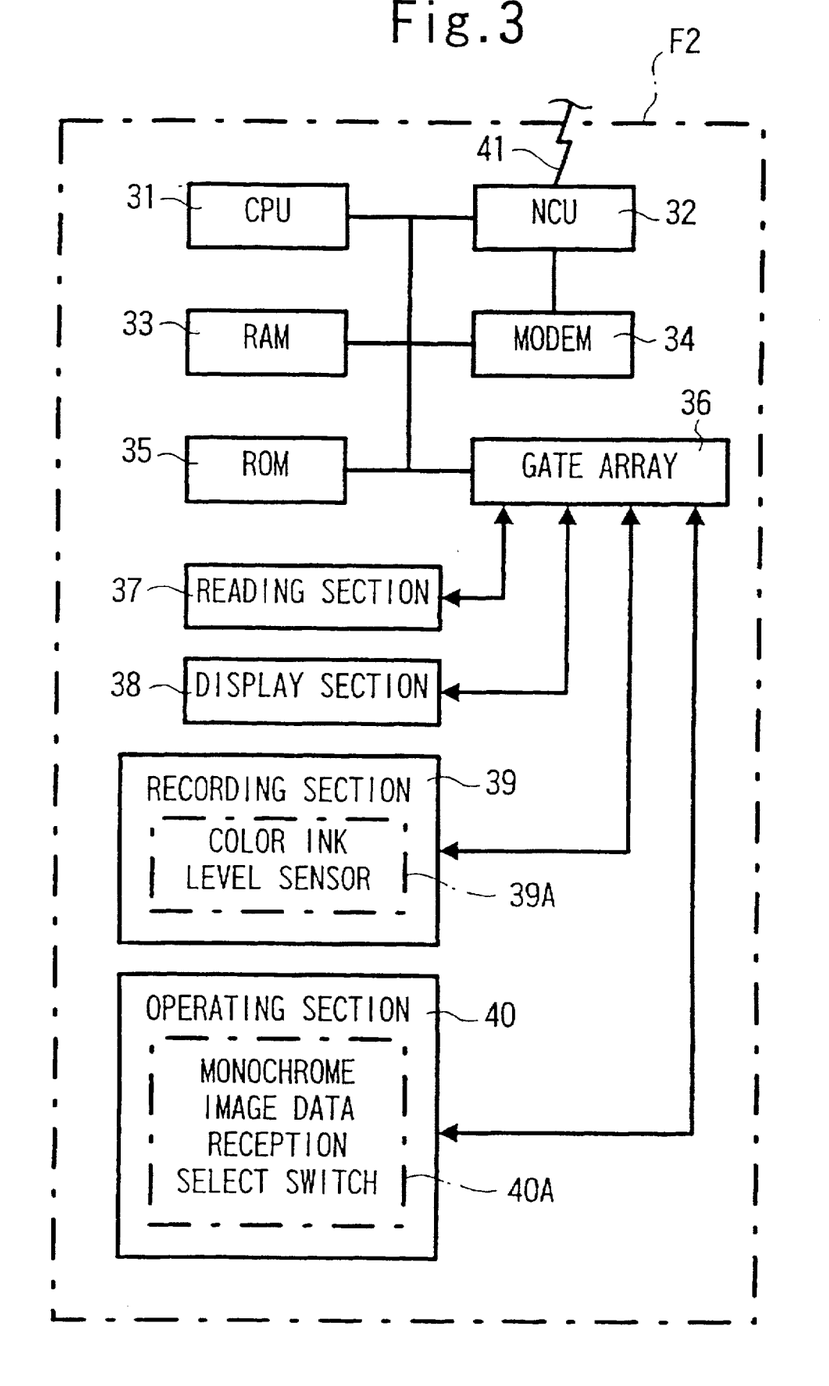
FIG. 3 is a block diagram illustrating a second preferred embodiment of a color facsimile apparatus.

FIG. 3 shows a circuit block diagram illustrating a second preferred embodiment of a color facsimile apparatus F2. The color facsimile apparatus F2 comprises a CPU 31, an NCU 32, a RAM 33, a modem 34, a ROM 35, a gate array 36, a reading section 37, a display section 38, a recording section 39, and an operator section 40. The CPU 31, the NCU 32, the RAM 33, the modem 34, the ROM 35, and the gate array 36 are interconnected with a bus line. The gate array 36 is connected with the reading section 37, the display section 38, the recording section 39, and the operator section 40.

The CPU 31 controls the color facsimile apparatus F2 in its entirety and is equivalent to one example of control means as referred to in this invention. The CPU 31 also provides a capability of converting color image data to monochrome image data, which will be described later.

The NCU 32 is connected to a telephone line 41 to perform network control. The RAM 33 stores data of a variety of types and also serves as an image memory for storing image data received by facsimile communication and image data obtained by scanning a document by the reading section 37. The modem 34 modulates data to be sent and demodulates received data. The ROM 35 stores a variety of programs.

The gate array 36 functions as an input/output interface of the CPU 31. The reading section 37 has a CCD, a three-color separation filter, and a document feed motor to read a multicolor document to output R, G, and B color signals. The display section 38 is composed of an LCD to make a variety of displays under control of the CPU 31.

The recording section 39 is composed of an ink jet color printer that enables color printing on a recording sheet based on the above-mentioned CMY data with a total of three color inks of cyan, magenta, and yellow or a total of four color inks of cyan, magenta, yellow, and black. The recording section 39 is provided with a color ink level sensor 39a for detecting the remaining amount of the color inks. The color ink level sensor is constituted such that, if the level of any one of the color inks drops below a predetermined level, a signal indicating thereof is outputted to the CPU 31.

One example of the color ink level sensor 39a is a sensor of a type in which a pair of electrodes is arranged at a predetermined height in an ink tank or ink cartridge containing a color ink to detect the remaining ink level based on a change in the electric resistance between the electrodes when the ink level drops below the pair of electrodes. It will be apparent to those skilled in the art that a sensor of another type may be used in which the remaining color ink level is detected optically. It will be also apparent to those skilled in the art that a sensor of still another type may be used in which only whether the ink remains or not is detected.

The operator section 40 is composed of a key switch group, from which a signal indicating an operation made by the user for example is transmitted. The operator section 40 is provided with an image data conversion select switch 40a. When this switch 40a is turned ON, a predetermined signal indicating thereof is transmitted to the CPU 31. The CPU 31 then puts the color facsimile apparatus F2 in the mode of converting received color image data to monochrome image data.

To be more specific, in the normal mode in which the image data conversion select switch 40a is not set to ON, when color image data, compressed by the execution of facsimile communication, are received, the CPU 31 decodes the received color image data and then processes the decoded color image data according to the receive mode (for example, intercepting reception by a memory or execution of facsimile reception while printing the received image data by the recording section 39) of the color facsimile apparatus F2. On the other hand, if the image data conversion select switch 40a is set to ON, the CPU 31 converts the decoded color image data to binary monochrome image data. Then, the CPU 31 processes the resultant monochrome image data according to the receive mode of the color facsimile apparatus F2.

It should be noted that the conversion of color image data to monochrome image data is performed by a method in which portions corresponding to one color (for example, black) in the color image data are extracted or a method in which one dot is turned ON as monochrome image data if there are data of which any one of color turns ON that dot, by way of example.

Even in the mode in which the above-mentioned image data conversion select switch 40a is not set to ON, the CPU 31 converts the decoded color image data to monochrome image data if the CPU 31 receives a signal from the color ink level sensor 39a indicating that the amount of remaining ink is below a predetermined level in the receive mode in which facsimile reception is performed while operating the recording section 39.

Further, when executing the intercepting reception, the CPU 31 accesses the RAM 33 at the start of facsimile reception to determine the available memory space (free space) for storing image data. If the available memory space is found lower than a predetermined level, the CPU 31 also converters the decoded color image data to monochrome image data as with the above-mentioned case.

It should be noted that the image data conversion processing by the CPU 31 as described above only converts color image data to monochrome image data; therefore, when monochrome image data are received, the received monochrome image data are decoded and then generally same processing as that performed by an ordinary monochrome facsimile apparatus is performed on the resultant monochrome image data.

Figure 4:
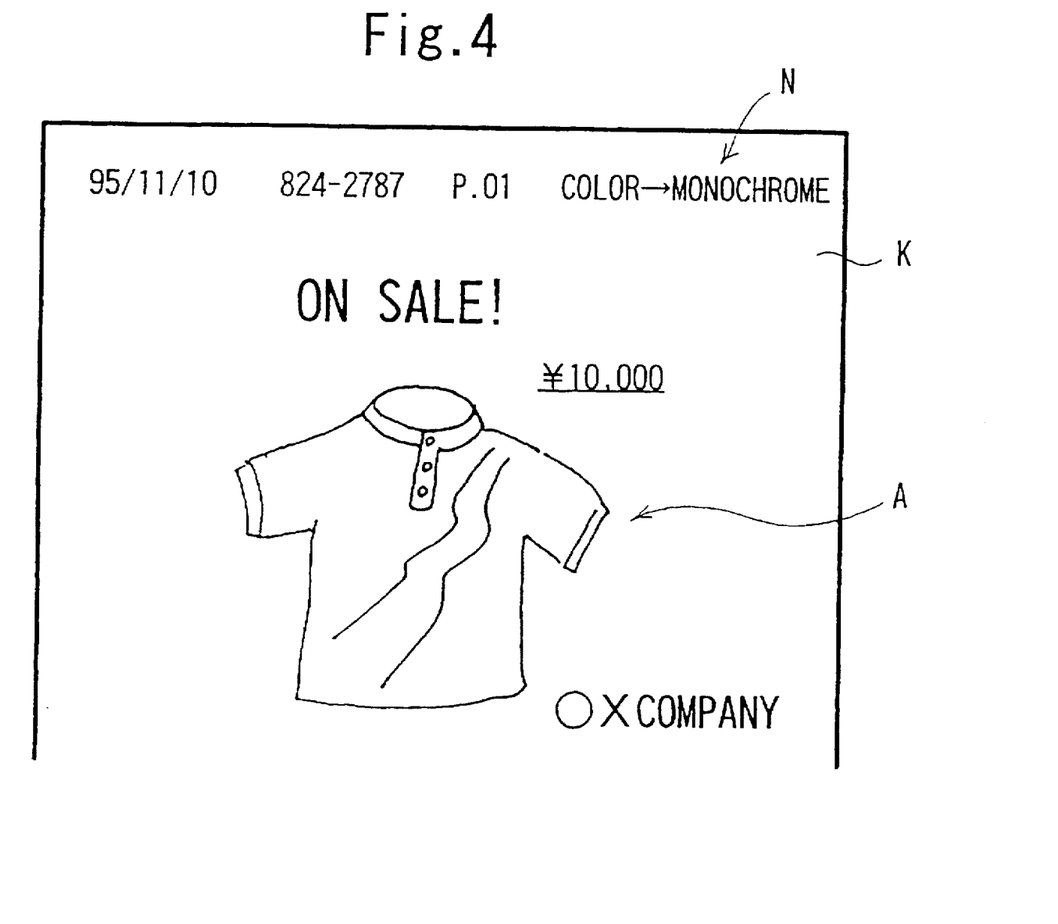
FIG. 4 shows a main portion of a print on a recording sheet outputted by converting received color image data to monochrome image data in the embodiment of FIG. 3.

If the CPU 31 converts the received color image data to monochrome image data, the information thereof is stored in the RAM 33. Then, if the resultant monochrome image data are printed on a recording sheet in the recording section 39, the CPU 31 performs a data processing such that information is printed on the recording sheet at a particular position such as the upper edge, indicating that the printed image data were converted from color image data. To be more specific, as shown in FIG. 4 for example, if an image A obtained by converting color image data to monochrome image data is printed on a recording sheet K, the CPU 31 performs a data processing such that an indicating portion N is printed indicating "COLOR→MONO" for example in the proximity of positions on top of the recording sheet K at which facsimile data such as reception date and number of pages are printed.

Figure 5:
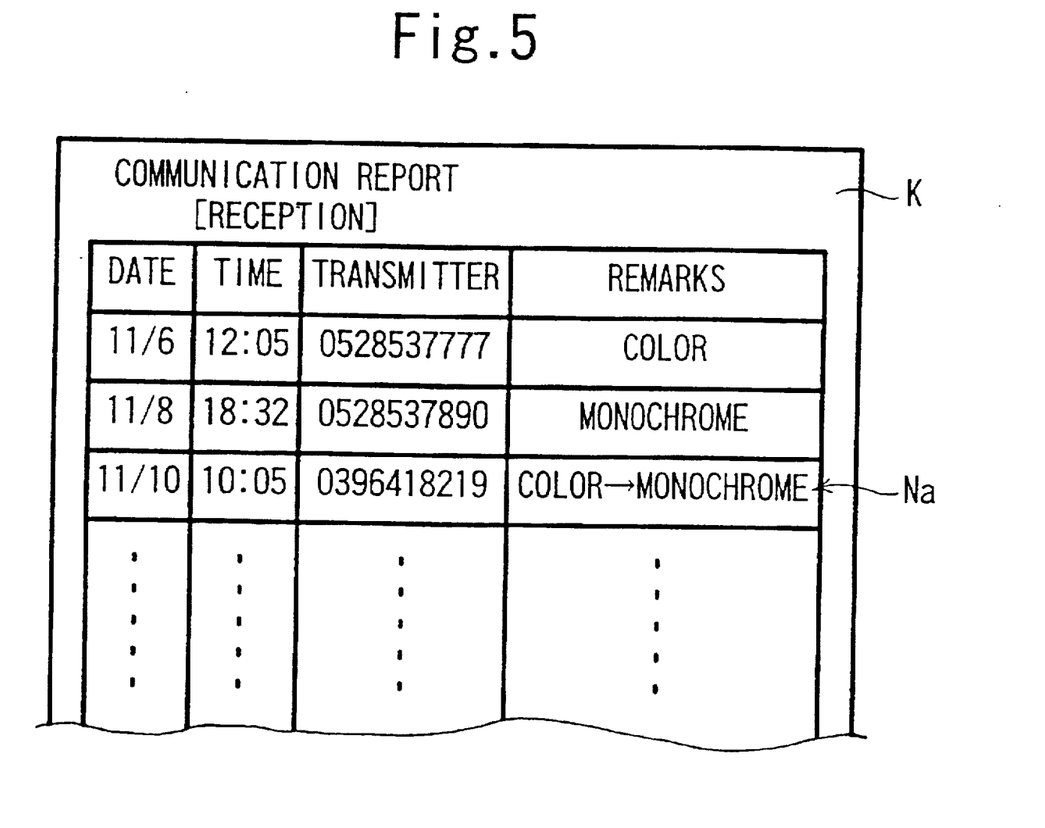
FIG. 5 is a main portion of an example of a communication control report in the embodiment of FIG. 3.

Further, when outputting a communication control report, the CPU 31 performs a data processing for the communication control report such that the conversion if any from color image data to monochrome image data is indicated. To be more specific, as shown in FIG. 5 for example, if the communication control report is printed on the recording sheet K, the CPU 31 performs a data processing such that an indicating portion Na indicating "COLOR→MONO" is printed at a predetermined position corresponding to the facsimile communication in which the received color image data were converted to monochrome image data.

The indicating portions N and Na are printed by sending by the CPU 31 of predetermined character code data for forming the images of these indicating portions N and Na to the recording section 39. It will be apparent to those skilled in the art that the specific contents of the indicating portions N and Na for indicating the conversion from color image data to monochrome image data are not limited to characters such as mentioned above; rather, these contents may be indicated with other characters, symbols or graphics.

Figure 6A:
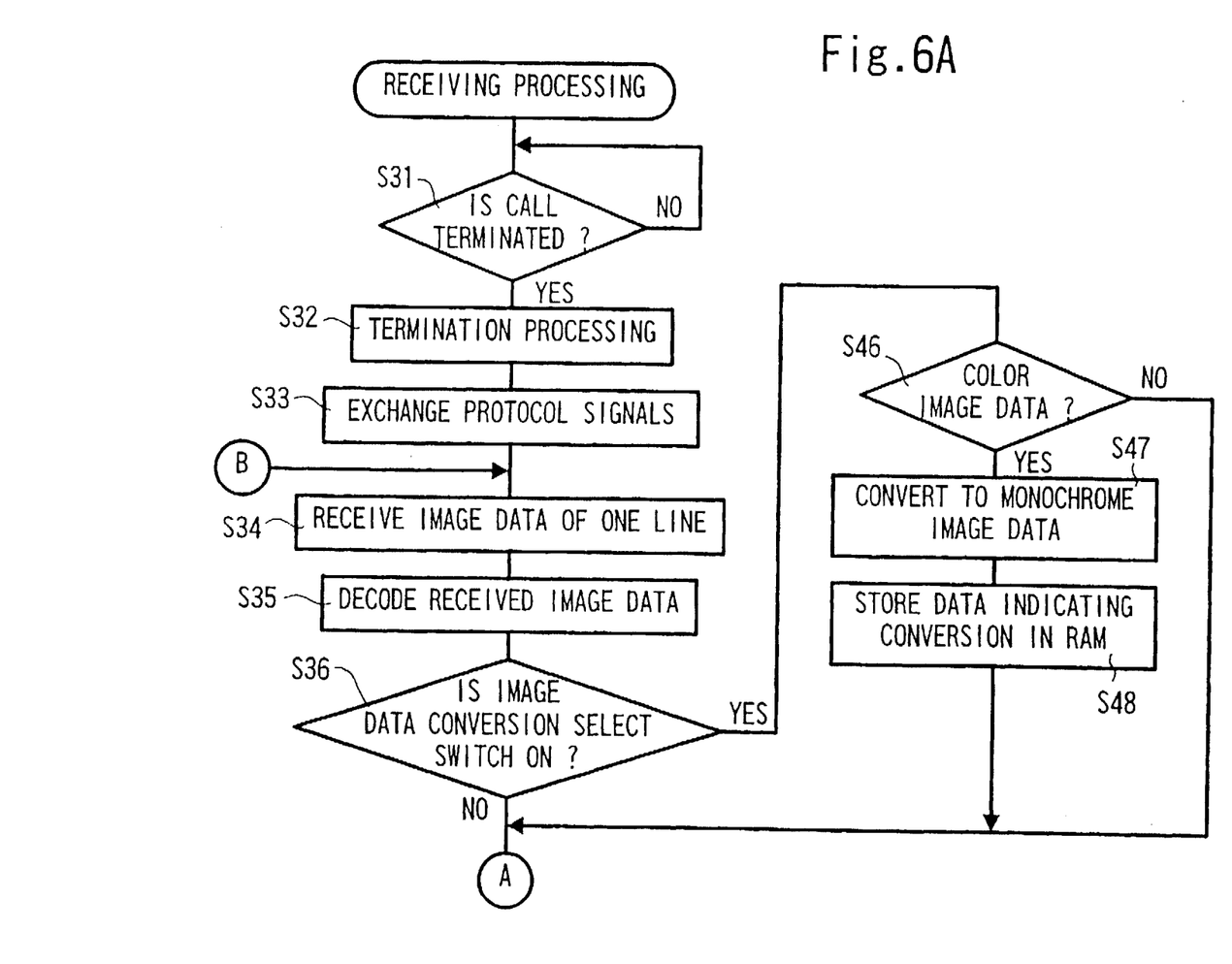
FIGS. 6A and 6B is a flowchart describing an example of a receiving procedure of the color facsimile apparatus of FIG. 3.
Figure 6B:
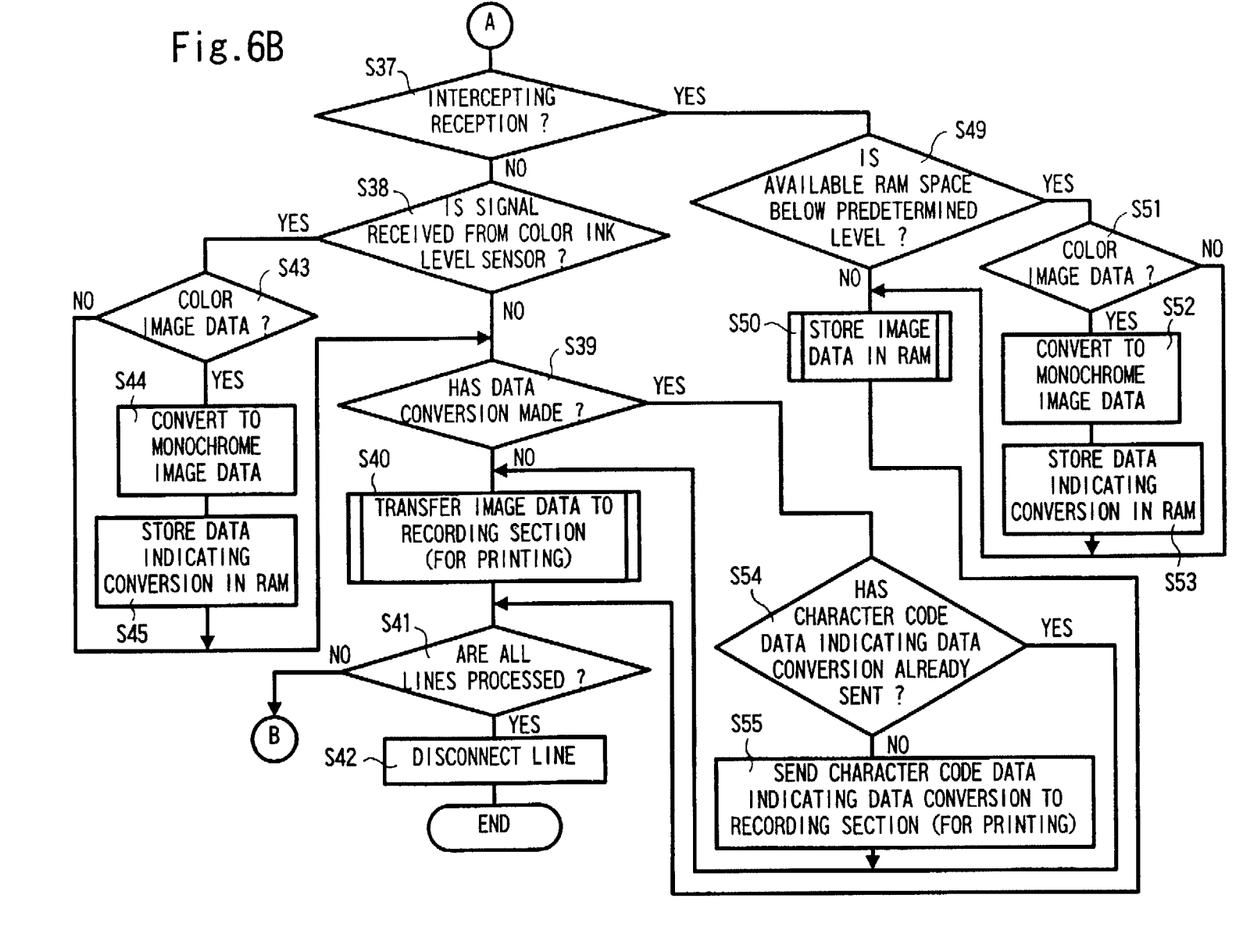

In what follows, a processing procedure for facsimile reception will be described with reference to the flowchart of FIGS. 6A and 6B.

First, a call terminates on the color facsimile apparatus F2 (step S31; YES) and, when a call terminating processing is performed (step S32), the CPU 31 executes exchange of protocol signals with a facsimile apparatus of the sending side (the side that originated the call) (step S33) and then receives compressed image data for one line (step S34). Then, the CPU 31 decodes the received image data (step S35).

Next, if the image data conversion select switch 40a is set to OFF and the color facsimile apparatus F2 is set to the normal mode (step S36; NO) and the intercepting reception mode is selected (step S37; YES), then the CPU 31 accesses the RAM 33 to determine the available memory space. If the available memory space is found not less than a predetermined level (step S49; NO), the CPU 31 stores the decoded image data in the RAM 33 regardless whether the decoded image data are color image data or monochrome image data (step S50).

The storage of the image data in the RAM 33 is performed presupposing the available memory space of the RAM 33 being not less than the predetermined level. Therefore, even if the received image data are color image data, which are larger in data amount, the trouble of overflowing the memory area of the RAM 33 can be prevented.

On the other hand, if the available memory space of the RAM 33 is found below the predetermined level (step S49; YES) in execution of the intercepting reception (step S37; YES), the processing to be performed differs depending on the type of the received image data. Namely, if the received image data are monochrome image data (step S51; NO), these image data are stored in the RAM 33 without conversion (step S50). Even if the available memory space of the RAM 33 is below the predetermined level, when the received image data are monochrome image data, which are small in data quantity as compared with color image data, there is no fear of immediately overflowing the RAM 33.

If the received image data are color image data (step S51; YES), the CPU 31 converts the received color image data to monochrome image data (step S52) and stores data indicating this data conversion in the RAM 33 (step S53). Then, the CPU 31 stores the converted monochrome image data in the RAM 33 (step S50).

If the available memory space of the RAM 33 is below the predetermined level, storing color image data, which are large in data quantity, without conversion, into the RAM 33 possibly overflows the same; however, converting color image data to monochrome image data as mentioned above before storage reduces that possibility.

At the intercepting reception by the color facsimile apparatus F2 (step S37; YES), the above-mentioned series of processing operations is repeated for each line of the received image data. When all the lines have been processed (step S41; YES), the line is disconnected (S42), upon which the facsimile communication processing comes to an end.

It should be noted that, if at the above-mentioned intercepting reception, the data conversion from color to monochrome is made as mentioned above, the data indicating the data conversion is stored in the RAM 33 (step S53). Therefore, when a communication control report associated with this facsimile reception is outputted, the indicating portion Na can be displayed indicating the image data conversion as shown in FIG. 5. Consequently, the user of the color facsimile apparatus F2 can know that these image data are obtained by converting color image data. If the user wants to have the original color image data, the user can request the sending party for transmission of the original image data.

If, unlike the above-mentioned case, the image data conversion select switch 40a is set to OFF (step S36; NO) and the intercepting reception is not selected (step S37; NO), the facsimile reception is performed while the received image data are printed in the recording section 39. If, in this receive mode, the CPU 31 receives a signal from the color ink level sensor 39a indicating that the ink is running short (step S38; YES), the subsequent processing differs as follows depending on whether the received image data are color image data or monochrome image data.

Namely, if the received image data are color image data (step S43; YES), the CPU 31 converts the received color image data to monochrome image data (step S44) and stores the data indicating the conversion in the RAM 33 (step S45). Next, the CPU 31 sends character code data for displaying the data conversion to the recording section 39 (step S39; YES, step S54, step S55). Consequently, the character code data are converted to an image in the recording section 39. The indicating portion N for indicating the image data conversion is printed on the recording sheet K at a predetermined position, top edge thereof for example as shown in FIG. 4. At the same time, the CPU 31 transfers the converted monochrome image data to the recording section 39 (step S40). Therefore, following the printing of the above-mentioned indicating portion N, the received data are printed on the recording sheet K as the image A in monochrome.

It is desirable that the monochrome printing be made in black ink in the recording section 39 to enhance legibility. If the monochrome image data are printed in yellow for example, their legibility decreases.

The printing of color image data as monochrome image data on the recording sheet K is also performed if the remaining amount of color ink of the recording section 39 is below the predetermined level. Therefore, the printing of the received color image data is not discontinued due to the shortage of color inks. The received image data are printed as the monochrome image A, which is sufficient for the user to generally grasp the contents of the facsimile communication.

Since the recording sheet K printed with the above-mentioned monochrome image A is also printed with the indicating portion N indicating that the image data conversion has been made, the user who sees this indicating portion N can appropriately request the sending party for the original color image data. It should be noted that there may be the indicating portion N at only one position on each recording sheet K. Therefore, when the CPU 31 sends character code data to the recording section 39 once, the character code data are not repeatedly sent to the recording section 39 at least in the image processing of the same page (step S54; YES).

It should be noted that, unlike the above-mentioned case, if the received image data are monochrome image data (step S43; NO), these monochrome image data are transferred to the recording section 39 without conversion to be printed in the recording section 39 (step S40).

On the other hand, if the CPU 31 has not received the signal from the color ink level sensor 39a indicating that the color inks are running short (step S38; NO), the received color image data are transferred to the recording section 39 without being converted to monochrome image data (step S40). In this case, the color inks in the recording section 39 remain sufficiently, so that color ink shortage during facsimile reception can be prevented from easily occurring, thereby ensuring proper color printing of the received image data.

The above-mentioned series of processing operations is performed with the image data conversion select switch 40a set to OFF (step S36; NO). If the image data conversion select switch 40a is set to ON (step S36; YES), the following processing takes place.

Namely, if the received image data are monochrome image data (step S46; NO) and the receive mode is the intercepting reception mode, the CPU 31 stores the received monochrome image data in the RAM 33 (step S50). If the receive mode is other than the intercepting reception (step S37; NO), the received monochrome image data are transferred to the recording section 39 to be processed for printing (step S40).

On the other hand, if the received image data are color image data (step S46; YES), the CPU 31 converts the received color image data to monochrome image data (step S47) and stores the data indicating the data conversion in the RAM 33 (step S48). These processing operations are performed regardless of the available memory space of the RAM 33 or the remaining amount of color inks. Then, the CPU 31 stores the converted monochrome image data in the RAM 33 depending on whether the color facsimile apparatus F2 is in the intercepting reception mode (step S50) or transfers the same to the recording section 39 for printing (step S40).

Consequently, if the image data conversion select switch 40a is set to ON, the received image data are stored in the RAM 33 simply as monochrome image data regardless of whether the same are color or monochrome or printed as a monochrome image. As a result, if the user of the color facsimile apparatus F2 desires to acquire the memory capacity of the RAM 33 or save the color inks, the facsimile reception according to such requirements can be made appropriately. Further, if the received image data are color image data, the data indicating that was stored in RAM 33 in step S48, so that the indicating portion N can be printed if the image data are printed on the recording sheet K as shown in FIG. 4 and the indicating portion Na can be printed if the communication control report is printed as shown in FIG. 5. Thus, the user can be appropriately notified that the original image data are color image data.

In the second preferred embodiment mentioned above, the received color image data are converted to monochrome image data if the remaining color ink amount of the recording section 39 constituted by a color ink jet printer is less than a predetermined level. It will be apparent to those skilled in the art that the present invention is by no means restricted to such a constitution.

For example, detecting means such as a sensor is constituted such that only whether a color ink remains or used up is detected and, only if the remaining amount of any one of color inks is zero, the received color image data may be converted to monochrome image data.

Further, the recording section 39 for color-printing on a recording sheet can be put in the color printing disabled state by not only the above-mentioned occurrence of color ink shortage. If a printer using a color-developing heat-sensitive sheet is used for the recording section, color printing is disabled also when the heat-sensitive sheet is not set in place to a predetermined position or the sheet has run short. Therefore, the embodiment can be constituted such that the received color image data are converted to monochrome image data when such a situation has taken place.

Still further, in the above-mentioned second embodiment, the received color image data are converted to monochrome image data only when the available memory space of the RAM 33 is lower than a predetermined level in the intercepting reception. However, the present invention is not restricted thereto. It will be apparent that, in the intercepting reception, the embodiment may be constituted such that the received color image data are always converted to monochrome image data regardless of the available memory space of the RAM 33. Such a constitution is advantageous in reducing the possibility of overflowing the memory area of the RAM 33 with received color image data even if the memory capacity of the RAM 33 is relatively small.

In addition, in the above-mentioned embodiment, the information indicating the conversion from color to monochrome is printed on the recording sheet; however, the present invention is not restricted thereto. It will be apparent that the information may be displayed on the display section 8 composed of an LCD for example.

In the present invention, the image data conversion select switch 40a need not be provided as a dedicated operator switch; rather, the capability of this switch, namely setting the mode for converting color image data to monochrome image data, may be implemented by a combination of numeric keys for example.

It will be also apparent to those skilled in the art that the constitution of each of the sections of the image communication apparatus associated with the present invention is not restricted to the color facsimile apparatuses of the above-mentioned embodiments and therefore can be modified in a variety of ways specifically. In the second embodiment, the processing for converting color image data to monochrome image data is performed by the CPU 31; however, such processing may be performed by other means than the CPU.

In the second embodiment, a color ink jet printer is used for the recording section 39. It will be apparent to those skilled in the art that a color laser beam printer may be used instead. If the color laser beam printer is used, a mechanism for detecting the remaining toner amount may be provided instead of the ink level detecting sensor.

While this invention has been described in conjunction with specific embodiments thereof, it is evident that many alternatives, modifications and variations will be apparent to those skilled in the art. Accordingly, preferred embodiments of the invention as set forth herein are intended to be illustrative, not limiting. Various changes may be made without departing from the spirit and scope of the invention as defined in the following claims.

What is claimed is:

1. A color printing apparatus for printing color image data received via a transmission that includes multicolor image information, comprising:

a converting device that converts said received color image data to monochrome image data when a predetermined condition determined before receiving the transmission of the color image data is satisfied, the monochrome image data including monochrome image information.

2. A color printing apparatus according to claim 1, further comprising:

a memory for storing said color image data to be printed; and a determining device that determines an available memory space, wherein said converting device converts said color image data to said monochrome image data if said determining device determines that the available memory space is lower than a predetermined level.

3. A color printing apparatus according to claim 1, further comprising:

a printing device that prints the color image data using a plurality of color materials including a black material, wherein said converting device converts said color image data to said monochrome image data if an amount of said color materials is less than a predetermined amount.

4. A color facsimile apparatus for receiving and outputting color image data that includes multicolor image information, comprising:

a communication device that receives image data from a sending facsimile apparatus; and a response device that prevents partial transmission of image data by requesting, before receiving a transmission of the image data, said sending facsimile apparatus to transmit monochrome image data.

5. A color facsimile apparatus according to claim 4, further comprising:

a printing device having a plurality of color materials, said printing device printing an image according to said color image data; and a control device that controls said printing device to execute a printing operation by using one of the plurality of color materials when said communication device receives the monochrome image data from said sending facsimile apparatus.

6. A color facsimile apparatus according to claim 4, further comprising:

a memory for storing said received image data; and
   a determining device that determines a free space in said memory, wherein said response device requests the said sending facsimile apparatus to send the monochrome image data if the free space of said memory is less than a predetermined level.

7. A color facsimile apparatus, comprising:

a communication device that receives color image data of a color image that includes multicolor image information;

a printing device that prints said color image by using a plurality of color materials; and a control device that converts said color image data to monochrome image data that includes monochrome image information and for outputting the monochrome image data to said printing device if a predetermined condition determined before receiving a transmission of the color image data is satisfied.

8. A color facsimile apparatus according to claim 7, wherein said printing device prints said monochrome image data outputted from said control device by using a black color material.

9. A color facsimile apparatus according to claim 7, further comprising:

a memory for storing said color image data received by said communication device; and a determining device that determines a free space of said memory, wherein said control device converts said color image data to the monochrome image data if the free space of said memory is less than a predetermined level.

10. A color facsimile apparatus, comprising:

a communication device that communicates with a sending device for transmission of image data, wherein the color facsimile apparatus outputs monochrome image data, based on information communicated with the sending device and a state of the color facsimile apparatus determined before receiving a transmission of the image data to prevent partial transmission of the image data, wherein the facsimile apparatus outputs monochrome image data if the state of the color facsimile apparatus only allows an incomplete printing of the image data.

11. The color facsimile apparatus of claim 10, further comprising:

a response device that requests the sending device to transmit the monochrome image data if the state of the color facsimile apparatus satisfies a predetermined condition, the communication device receiving the monochrome image data from the sending device.

12. The color facsimile apparatus of claim 11, wherein the predetermined condition comprises at least one of:

1) a free space of a memory in the color facsimile apparatus being less than a predetermined level;

2) at least one of a plurality of printing devices of the color facsimile apparatus being inoperative;

3) a recording medium being improperly set; and 4) a monochrome printing instruction being received.

13. The color facsimile apparatus of claim 12, wherein the facsimile apparatus prints using one of a plurality of printing materials including color inks for printing with ink jets and toner for printing with laser printers.

14. The color facsimile apparatus of claim 10, further comprising:

a printing device; and a control device coupled to the printing device that converts color image data received by the communication device to the monochrome image data and for outputting the monochrome image data to the printing device if the state of the color facsimile apparatus satisfies a predetermined condition.

15. The color facsimile apparatus of claim 14, wherein the predetermined condition comprises at least one of:
1) a free space of a memory in the color facsimile apparatus being less than a predetermined level;
2) at least one of a plurality of printing devices of the color facsimile apparatus being inoperative;
3) a recording medium being improperly set; and
4) a monochrome printing instruction being received.

16. The color facsimile apparatus of claim 15, wherein the facsimile apparatus prints using one of a plurality of printing materials including color inks for printing with ink jets and toner for printing with laser printers.

17. The color facsimile apparatus of claim 14, wherein if the printing device prints the monochrome image data that is converted by the control device to the monochrome image data from the color image data received by the communication device, then the printing device prints conversion indicators indicating that the color image data have been converted to the monochrome image data.

18. The color facsimile apparatus of claim 17, wherein the conversion indicators include at least one of special characters printed together with the monochrome image data on a recording medium and a message printed in a report associated with receiving the color image data.

19. A method for operation of a color facsimile apparatus, comprising:

communicating with a sending device for receiving transmission of image data; and outputting monochrome image data based on information communicated with the sending device and a state of the color facsimile apparatus determined before receiving a transmission of the image data to prevent partial transmission of the image data, wherein the facsimile apparatus outputs monochrome image data if the state of the color facsimile apparatus only allows an incomplete printing of the image data.

20. The method of claim 19, further comprising:

requesting the sending device to transmit the monochrome image data if the state of the color facsimile apparatus satisfies a predetermined condition; and receiving the monochrome image data from the sending device.

21. The method of claim 19, further comprising:

converting color image data received from the sending device to the monochrome image data if the state of the color facsimile apparatus satisfies a predetermined condition; and outputting the monochrome image data to a printing device that prints the monochrome image data.

22. The method of claim 21, further comprising:

printing conversion indicators if the color image data is converted to the monochrome image data and the monochrome image data is printed.

* * * * *